Figure 1:
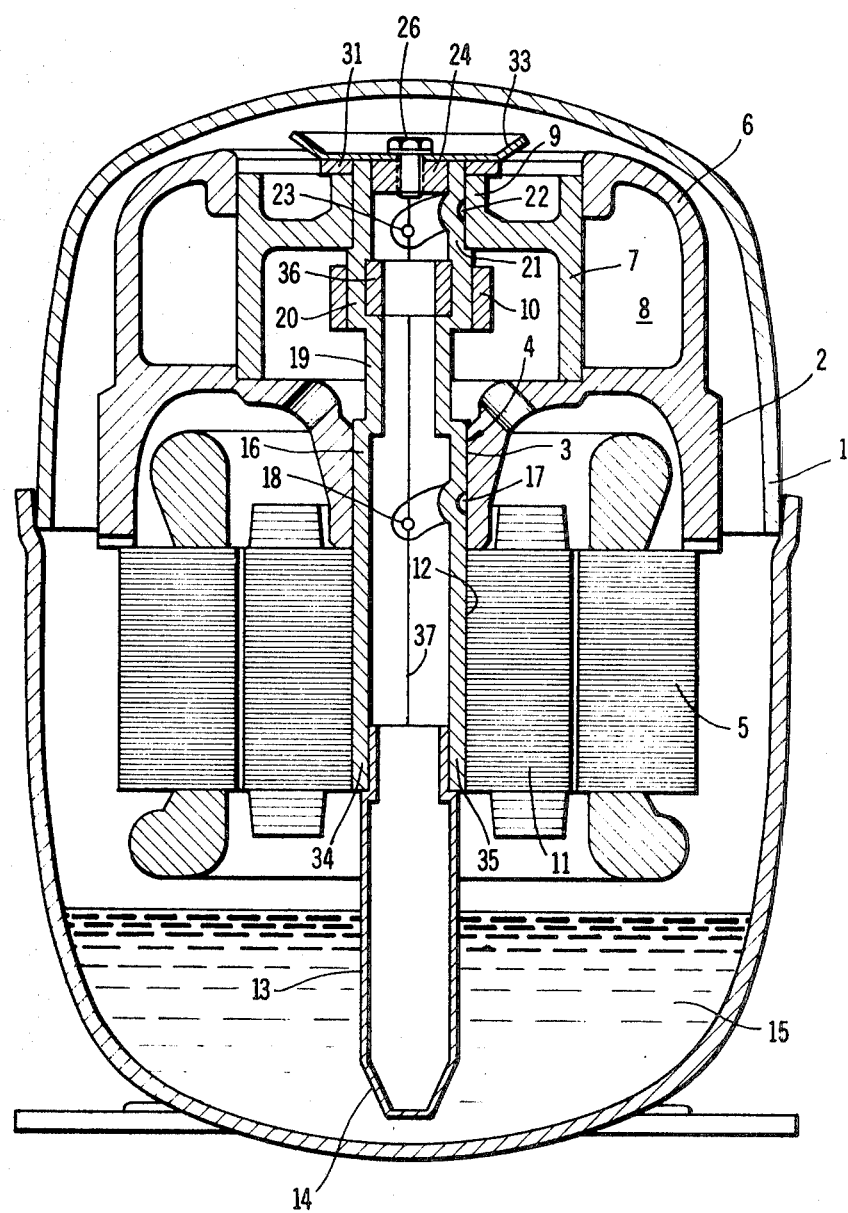

United States Patent

[11] 3,599,509

| | | |
|---|---|---|
| [72] | Inventor | Bendt Wegge Romer<br>Ulkebol Sonderborg, Denmark |
| [21] | Appl. No. | 863,227 |
| [22] | Filed | Oct. 2, 1969 |
| [45] | Patented | Aug. 17, 1971 |
| [73] | Assignee | Danfoss A/S<br>Nordborg, Denmark |
| [32] | Priority | Oct. 8, 1968 |
| [33] | | Germany |
| [31] | | P 18 01 719.1 |

[54] CRANKSHAFT, PARTICULARLY FOR ENCASED REFRIGERANT COMPRESSORS, AND A METHOD FOR ITS MANUFACTURE
10 Claims, 6 Drawing Figs.

[52] U.S. Cl..................................................... 74/598, 29/6

[51] Int. Cl................................................... F16c 3/10
[50] Field of Search........................................... 74/598, 595; 29/6, 463, 475

[56] References Cited
UNITED STATES PATENTS

| | | | |
|---|---|---|---|
| 2,225,451 | 12/1940 | Hirth............................ | 74/598 |
| 2,252,480 | 8/1941 | Boulet.......................... | 74/595 |

*Primary Examiner*—William F. O'Dea
*Assistant Examiner*—F. D. Shoemaker
*Attorney*—Wayne B. Easton

ABSTRACT: The invention is a crankshaft made from two sheet metal stampings having longitudinally extending edges which are joined as by welding to form a unitary crankshaft.

CRANKSHAFT, PARTICULARLY FOR ENCASED REFRIGERANT COMPRESSORS, AND A METHOD FOR ITS MANUFACTURE

The invention relates to a crankshaft, particularly for encased refrigerant compressors, and consisting of interconnected parts, and a method for its manufacture.

Crankshafts are as a rule produced in one piece, e.g. by die-forging. Crankshafts are also known, the shaft journals and crank journals of which consist of cylindrical portions which are welded together end-on at the point of overlap. The weld however is endangered by the risk of fractures due to torsion. Still less capable of undergoing load is a crankshaft, the shaft journals and crank journals of which consist only of butt-welded lengths of tube, since here the weld area is reduced to two small zones.

Crankshafts often contain a bore, either for the purpose of reducing weight or for that of providing a passage for oil. The latter case applies particularly where encased refrigerant compressors are concerned, where a quite large quantity of oil has to be passed through the crankshaft, this being used not only for lubricating purposes but also for oil circulation purposes. The subsequent boring of the crankshaft, manufactured as a single piece, involves, however, a considerable amount of work. The same is true as regards the crankshaft composed of a number of cylindrical portions, the change in the structure of the metal, associated with welding, rendering the boring operation still more difficult. A crankshaft consisting of lengths of tube, while being light cannot however be used for the transfer of oil, since it does not contain an enclosed passage.

The object of the invention is to provide a light crankshaft having a large inner cross section for any passage of oil that might be envisaged, which crankshaft is capable of transmitting a large torque and requires little work in its manufacture.

According to the invention this object is achieved by making the crankshaft from two shaped sheet metal portions, the lines of separation of which extend along the crankshaft.

In a crankshaft of this kind, the material is largely reduced to the outside wall of the crankshaft. All the remaining inner cross section is available for other purposes, e.g. for the passage of oil. The weight of the crankshaft is extremely low. Since the lines of separation extend along the crankshaft, either straight or helically, the forces resulting from torque are substantially at right angles to these lines, so that the lines of separation at most reduce the maximum value of the torque that can be transmitted to only a slight extent. Manufacture is very simple, since the shaped sheet metal portions can be pressed in one operation and joined together in a second operation.

Preferably the lines of separation are disposed in the plane of symmetry of the crankshaft. If this condition is met, the shaped sheet metal portions can be removed in a particularly simple manner from the press die, since there is adequate taper at all points.

Furthermore, the shaped sheet metal portions can between them accommodate a reinforcing insert. It is possible in this manner to produce a particularly light crankshaft and to provide reinforcement only at those points where heavier loading occurs, e.g. at the crank journal.

In a preferred arrangement, the shaped sheet metal portions have a peripheral face which departs from the circular form, in particular a flattened portion, for the purpose of accommodating a further component, e.g. a counterweight or a centrifuging disc, which rotates with the crankshaft. A cross-sectional change of this kind can be very easily obtained in the pressing operation, whereas additional operations would be required if this were done by machining.

It is also possible to form lubricating grooves and/or oil outlet orifices in the shaped sheet metal portions by pressing. None of these steps calls for additional operations.

It is often required, particularly in the case of an encased refrigerant compressor having a vertical crankshaft, to provide special arrangements at the end face for discharging the oil in a certain direction. In the crankshaft of the invention this can be achieved by sealing the crankshaft at its end by means of an insert which leaves an oil outlet orifice on the side facing the crank journal.

The method of manufacturing a crankshaft in accordance with the invention is characterized in that the shaped sheet metal portions are produced, joined together and then simply finish machined by grinding. There is no difficulty in producing and joining the shaped sheet metal portions in so clean a manner that no further machining is necessary.

The joint can be made by, for example, welding or soldering along the lines of separation. A welding method that could be used is, for example, the resistance pressure process. Welding by means of an electron beam, under vacuum, is however particularly suitable. This method results in an optimally clean and strong welded seam.

In some instances at least, the joint can be made by overlapping the parts and particularly by shrinking one on to the other. This is of advantage especially when, for other reasons, parts such as a centrifuging disc or a counterweight have to be fitted on the crankshaft.

Built-in parts, e.g. reinforcing liners, can be simply inserted during the joining of the shaped sheet metal portions, and as a rule these do not require any special fixing means.

Figure 2:
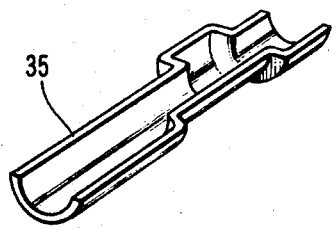
Figure 3:
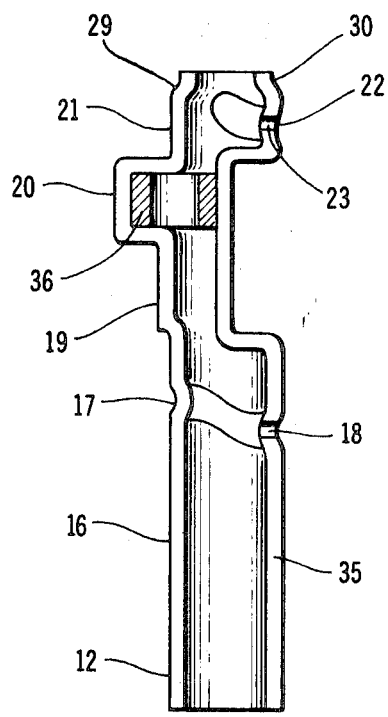
Figure 5:
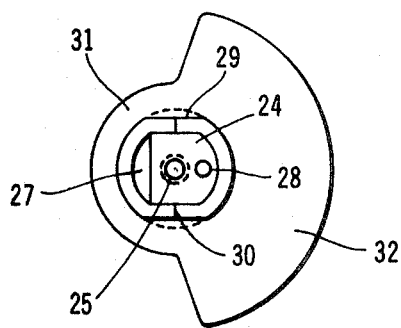
Figure 6:
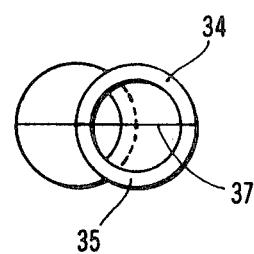
Figure 4:
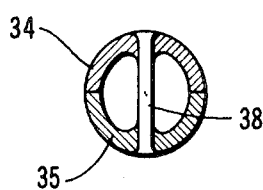

The invention will now be described in more detail by reference to an embodiment illustrated in the drawing, in which:

FIG. 1 shows a longitudinal section through an encased refrigerant compressor, equipped with the crankshaft of the invention, FIG. 2 is a perspective illustration of one of the two shaped sheet metal portions forming the crankshaft, FIG. 3 shows a shaped sheet metal portion seen at its open side, FIG. 4 is a lower end view of the crankshaft without attachments, FIG. 5 is an upper end view of the crankshaft, and FIG. 6 illustrates a further possible way of joining the shaped sheet metal parts.

A carrier element 2 for the motor is mounted in a case 1 on springs, not illustrated. It forms a bearing 3 for a crankshaft 4, carries the stator 5 of a drive motor and forms walls 6, which, together with an insert 7, defines sound-absorbing chambers 8. The insert 7 carries a second bearing 9 for the crankshaft 4. The cylinder of the compressor is also formed in the carrier element 2; its axis extends at right angles to the plane of the drawing. The drive is imparted by way of a crank bearing 10, which is connected to the compressor piston by way of a connecting rod, not illustrated. Also forming part of the motor is a squirrel cage rotor 11, mounted on the crankshaft 4.

The crankshaft is comprised of a number of sections. A lower section 12 accommodates, externally, the rotor 11 and, internally, the upper end of a tube 13, the inlet 14 to which is of conical shape and can therefore pass up oil from the sump 15. Then follows a section 16 of the same diameter, which rests in the bearing 3 and has a helical lubricating groove 17 and an oil outlet bore. Adjoining this is a transition section 19 which enables the crankshaft 10 to be inserted from below. Finally there is a crank section 20 and a second bearing section 21, which again contains a helical oil groove 22 and an oil outlet orifice 23. The crank section 20 can also be of similar form. Fitted in the top of the shaft is an insert 24, which contains a threaded bore 25 for receiving a screw 26, leaves an opening 27 at the side facing the crank, and contains a bore 28 for accommodating a locking pin. At its upper end, the crankshaft has two opposite flat faces 29 and 30, on which is mounted, so as to rotate therewith, a disc 31, forming an axial bearing and at the same time carrying a counterweight 32. The entire arrangement is covered by a centrifuging disc 33 which is secured by the screw 26 and is prevented from rotating by means of the pin inserted in the hole 28.

The actual crankshaft 4 consists of two shaped sheet metal portions 34 and 35, which are generally of the form shown in FIG. 2 and in which are preformed all the other details such as the oil outlet orifices 18 and 23, the helical lubricating grooves 19 and 22, the flattened portions 29 and 30, etc. These two shaped sheet metal portions 34 and 35 are joined together and, in the present case, a reinforcing ring 36 is inserted in the crank section 20 during the joining operation. The joint is expediently made by welding along the line of separation, by means of an electron beam, under vacuum. The crankshaft so produced then only requires to be ground on the outside.

Another form of joint is illustrated in FIG. 6, which shows the two shaped sheet metal portions 34 and 35 connected together by a rivet 38. The disc 31 is also used as a means for holding the shaped sheet metal portions together.

When the system is in use, oil is passed upwards through the crankshaft 4 by way of the tapered mouth 14, lubricant passing through the oil outlet orifices 18 and 23 to the lubricating grooves 17 and 22 and therefore to the bearings 3 and 4, and if required, the crank bearing 10 can be lubricated in a similar way. The rest of the oil flows up and out through the orifice 27 and is flung by the centrifuging disc 33 on to the wall of the case, from which it flows back into the sump 15, cooling as it does so.

I claim:

1. A crankshaft comprising two elongated shells, each of said shells having two longitudinally extending edge surfaces in a single plane with the two edge surfaces of one shell being the mirror image of the two edge surfaces of the other shell, each of said shells having a partial shank portion and a partial crank portion eccentrically offset from said shank portion, said edge surfaces of said shells being joined metallurgically to form a unitary crankshaft.

2. A crankshaft according to claim 1 wherein said shells are generally symmetrical relative to said joined edge surfaces.

3. A crankshaft according to claim 1 wherein an insert having an outer cylindrically shaped surface is between said crank portions of said shells.

4. A crankshaft according to claim 1 wherein each of said shells has a longitudinally extending extension on the opposite side of said crank portion from said shank portion, each said extensions having a flat external surface portion, a component mounted on said extension having a central opening with the same shape as the external shape as said extensions when joined.

5. A crankshaft according to claim 1 wherein at least one of said shells has a lubricating groove formed therein.

6. A crankshaft according to claim 1 wherein at least one of said shells has an oil outlet bore formed therein.

7. A method of manufacturing a crankshaft comprising the steps of forming two elongated shells each having two longitudinally extending edge surfaces in a single plane with the two edge surfaces of one shell being the mirror image of the two edge surfaces of the other shell, forming each of said shells with a partial shank portion and a partial crank portion eccentrically offset from said shank portion, and joining said edge surfaces of said shells metallurgically to form a unitary crankshaft.

8. A method of manufacturing a crankshaft according to claim 7 wherein said edge surfaces are joined by welding or soldering.

9. A method of manufacturing a crankshaft according to claim 8 wherein said welding is performed with an electron beam under vacuum.

10. A method of manufacturing a crankshaft according to claim 8 wherein said joining of said edge surfaces is made at least by partially overlapping said edge and shrinking one upon the other.